US007890604B2

(12) United States Patent
Millington et al.

(10) Patent No.: US 7,890,604 B2
(45) Date of Patent: Feb. 15, 2011

(54) CLIENT-SIDE CALLBACKS TO SERVER EVENTS

(75) Inventors: Bradley D. Millington, Bellevue, WA (US); Andrew Cheng-Min Lin, Seattle, WA (US); Nikhil Kothari, Sammamish, WA (US)

(73) Assignee: Microsoft Corproation, Redmond, WA (US)

( * ) Notice: Subject to any disclaimer, the term of this patent is extended or adjusted under 35 U.S.C. 154(b) by 1352 days.

(21) Appl. No.: 10/840,965

(22) Filed: May 7, 2004

(65) Prior Publication Data

US 2005/0256933 A1    Nov. 17, 2005

(51) Int. Cl.
G06F 15/16 (2006.01)
G06F 17/00 (2006.01)
G06F 3/00 (2006.01)

(52) U.S. Cl. .................. 709/219; 715/221; 715/744

(58) Field of Classification Search .................. 709/219; 715/221, 744
See application file for complete search history.

(56) References Cited

U.S. PATENT DOCUMENTS

| | | | |
|---|---|---|---|
| 3,937,925 A | 2/1976 | Boothroyd | |
| 3,956,615 A | 5/1976 | Anderson et al. | |
| 4,186,871 A | 2/1980 | Anderson et al. | |
| 4,807,154 A | 2/1989 | Scully et al. | |
| 4,847,785 A | 7/1989 | Stephens | |
| 4,949,300 A | 8/1990 | Christenson et al. | |
| 4,979,148 A | 12/1990 | Bush et al. | |
| 5,093,778 A | 3/1992 | Favor et al. | |
| 5,299,315 A | 3/1994 | Chin et al. | |
| 5,339,424 A | 8/1994 | Fushimi | |
| 5,349,657 A | 9/1994 | Lee | |
| 5,375,242 A | 12/1994 | Kumar et al. | |
| 5,388,156 A | 2/1995 | Blackledge, Jr. et al. | |
| 5,434,992 A | 7/1995 | Mattson | |
| 5,465,332 A | 11/1995 | Deloye et al. | |
| 5,471,318 A | 11/1995 | Ahuja et al. | |
| 5,517,655 A | 5/1996 | Collins et al. | |
| 5,548,340 A | 8/1996 | Bertram | |
| 5,550,560 A | 8/1996 | Kanada et al. | |
| 5,577,253 A | 11/1996 | Blickstein | |
| 5,604,908 A | 2/1997 | Mortson | |

(Continued)

FOREIGN PATENT DOCUMENTS

EP    01 11 1679    12/2000

(Continued)

OTHER PUBLICATIONS

European Search Report 01111678.7- 2201.

(Continued)

*Primary Examiner*—Aaron Strange
(74) *Attorney, Agent, or Firm*—Merchant & Gould PC

(57) ABSTRACT

Described herein are systems and methods for client-side callbacks to server events in which a Web server receives a message indicating a client-side event. The client-side event is associated with a specific component of a client resource, the specific component being one of multiple static components of the client resource. A server-side component generates a response to the received message and implements at least a subset of logic of the specific component. In generating the response to the message, server-side logic corresponding to other static components that are different than the specific component are not used.

37 Claims, 4 Drawing Sheets

U.S. PATENT DOCUMENTS

| | | |
|---|---|---|
| 5,608,890 A | 3/1997 | Berger et al. |
| 5,613,117 A | 3/1997 | Davidson et al. |
| 5,638,176 A | 6/1997 | Hobbs et al. |
| 5,640,449 A | 6/1997 | Worley et al. |
| 5,649,131 A | 7/1997 | Ackerman et al. |
| 5,659,753 A | 8/1997 | Murphy et al. |
| 5,664,228 A | 9/1997 | Mital |
| 5,675,520 A | 10/1997 | Pitt, III et al. |
| 5,689,703 A | 11/1997 | Atkinson et al. |
| 5,706,505 A | 1/1998 | Fraley et al. |
| 5,727,159 A | 3/1998 | Kikinis |
| 5,732,256 A | 3/1998 | Smith |
| 5,732,267 A | 3/1998 | Smith |
| 5,745,103 A | 4/1998 | Smith |
| 5,748,890 A | 5/1998 | Goldberg et al. |
| 5,754,774 A | 5/1998 | Bittinger et al. |
| 5,764,235 A | 6/1998 | Hunt et al. |
| 5,764,236 A | 6/1998 | Tanaka |
| 5,764,873 A | 6/1998 | Magid et al. |
| 5,774,670 A | 6/1998 | Montulli |
| 5,793,982 A | 8/1998 | Shrader et al. |
| 5,802,600 A | 9/1998 | Smith et al. |
| 5,812,996 A | 9/1998 | Rubin et al. |
| 5,835,724 A | 11/1998 | Smith |
| 5,855,020 A | 12/1998 | Kirsch |
| 5,873,097 A | 2/1999 | Harris et al. |
| 5,878,141 A | 3/1999 | Daly et al. |
| 5,878,282 A | 3/1999 | Mital |
| 5,889,992 A | 3/1999 | Koerber |
| 5,892,937 A | 4/1999 | Caccavale |
| 5,897,622 A | 4/1999 | Blinn |
| 5,897,644 A | 4/1999 | Nielsen |
| 5,911,145 A | 6/1999 | Arora et al. |
| 5,918,007 A | 6/1999 | Blackledge, Jr. et al. |
| 5,923,882 A | 7/1999 | Abrams et al. |
| 5,935,207 A | 8/1999 | Logue et al. |
| 5,937,409 A | 8/1999 | Wetherbee |
| 5,940,075 A | 8/1999 | Mutschler, III |
| 5,940,847 A | 8/1999 | Fein et al. |
| 5,953,524 A | 9/1999 | Meng et al. |
| 5,956,489 A | 9/1999 | San Andres et al. |
| 5,961,601 A | 10/1999 | Iyengar |
| 5,963,952 A | 10/1999 | Smith |
| 5,974,430 A | 10/1999 | Mutschler, III et al. |
| 5,983,227 A | 11/1999 | Nazem et al. |
| 5,987,242 A | 11/1999 | Bentley et al. |
| 5,987,247 A | 11/1999 | Lau |
| 5,991,802 A | 11/1999 | Allard et al. |
| 5,995,753 A | 11/1999 | Walker |
| 6,006,230 A | 12/1999 | Ludwug et al. |
| 6,014,637 A | 1/2000 | Fell et al. |
| 6,014,666 A | 1/2000 | Helland et al. |
| 6,023,714 A | 2/2000 | Hill et al. |
| 6,032,207 A | 2/2000 | Wilson |
| 6,038,551 A | 3/2000 | Barlow et al. |
| 6,058,455 A | 5/2000 | Islam et al. |
| 6,059,913 A | 5/2000 | Martin et al. |
| 6,061,690 A | 5/2000 | Nori et al. |
| 6,067,413 A | 5/2000 | Gustafsson et al. |
| 6,067,578 A | 5/2000 | Zimmerman et al. |
| 6,072,664 A | 6/2000 | Aoyagi et al. |
| 6,076,108 A | 6/2000 | Courts et al. |
| 6,101,502 A | 8/2000 | Heubner et al. |
| 6,101,607 A | 8/2000 | Bachand et al. |
| 6,108,717 A | 8/2000 | Kimura |
| 6,115,744 A | 9/2000 | Robins |
| 6,119,078 A | 9/2000 | Kobayakawa et al. |
| 6,119,115 A | 9/2000 | Barr |
| 6,119,155 A | 9/2000 | Rossmann et al. |
| 6,121,968 A | 9/2000 | Arcuri et al. |
| 6,121,970 A * | 9/2000 | Guedalia .................... 715/760 |
| 6,122,637 A | 9/2000 | Yohe et al. |
| 6,128,623 A | 10/2000 | Mattis et al. |
| 6,138,150 A | 10/2000 | Nichols et al. |
| 6,138,171 A | 10/2000 | Walker |
| 6,151,624 A | 11/2000 | Teare et al. |
| 6,167,438 A | 12/2000 | Yates et al. |
| 6,167,441 A | 12/2000 | Himmel |
| 6,167,524 A | 12/2000 | Goodnow et al. |
| 6,173,316 B1 | 1/2001 | De Boor et al. |
| 6,178,461 B1 | 1/2001 | Chan |
| 6,185,608 B1 | 2/2001 | Hon et al. |
| 6,185,625 B1 | 2/2001 | Tso et al. |
| 6,202,199 B1 | 3/2001 | Wydogny et al. |
| 6,203,220 B1 | 3/2001 | Takenoshita et al. |
| 6,205,480 B1 | 3/2001 | Broadhurst et al. |
| 6,212,192 B1 | 4/2001 | Mirashrafi et al. |
| 6,218,958 B1 | 4/2001 | Eichstaedt et al. |
| 6,223,217 B1 | 4/2001 | Pettus |
| 6,230,160 B1 | 5/2001 | Chan |
| 6,230,313 B1 | 5/2001 | Callahan et al. |
| 6,246,403 B1 | 6/2001 | Tomm |
| 6,246,422 B1 | 6/2001 | Emberling et al. |
| 6,247,044 B1 | 6/2001 | Gosling et al. |
| 6,249,844 B1 | 6/2001 | Schloss et al. |
| 6,253,228 B1 | 6/2001 | Ferris et al. |
| 6,253,234 B1 | 6/2001 | Hunt et al. |
| 6,279,151 B1 | 8/2001 | Breslau et al. |
| 6,282,670 B1 | 8/2001 | Rezaul Islam et al. |
| 6,286,133 B1 | 9/2001 | Hopkins |
| 6,297,819 B1 | 10/2001 | Furst |
| 6,300,947 B1 | 10/2001 | Kanevsky |
| 6,311,215 B1 | 10/2001 | Bakshi et al. |
| 6,326,957 B1 | 12/2001 | Nathan et al. |
| 6,334,126 B1 | 12/2001 | Nagatomo et al. |
| 6,334,157 B1 | 12/2001 | Oppermann et al. |
| 6,336,161 B1 | 1/2002 | Watts |
| 6,343,148 B2 | 1/2002 | Nagy |
| 6,345,279 B1 | 2/2002 | Li et al. |
| 6,351,767 B1 | 2/2002 | Batchelder et al. |
| 6,353,447 B1 | 3/2002 | Truluck et al. |
| 6,353,452 B1 | 3/2002 | Hamada et al. |
| 6,354,477 B1 | 3/2002 | Trummer |
| 6,356,283 B1 * | 3/2002 | Guedalia .................... 715/760 |
| 6,363,352 B1 | 3/2002 | Dailey et al. |
| 6,370,561 B1 | 4/2002 | Allard et al. |
| 6,370,682 B1 | 4/2002 | Eckardt et al. |
| 6,373,841 B1 | 4/2002 | Goh et al. |
| 6,381,735 B1 | 4/2002 | Hunt |
| 6,397,253 B1 | 5/2002 | Quinlan et al. |
| 6,401,099 B1 | 6/2002 | Koppulu et al. |
| 6,401,132 B1 | 6/2002 | Bellwood et al. |
| 6,405,241 B2 | 6/2002 | Gosling et al. |
| 6,412,008 B1 | 6/2002 | Fields et al. |
| 6,421,717 B1 | 7/2002 | Kloba et al. |
| 6,421,733 B1 | 7/2002 | Tso et al. |
| 6,424,981 B1 | 7/2002 | Isaac et al. |
| 6,426,761 B1 | 7/2002 | Kanevsky et al. |
| 6,430,575 B1 | 8/2002 | Dourish et al. |
| 6,438,576 B1 | 8/2002 | Huang et al. |
| 6,457,030 B1 | 9/2002 | Adams et al. |
| 6,457,172 B1 | 9/2002 | Carmichael et al. |
| 6,460,071 B1 | 10/2002 | Hoffman |
| 6,460,141 B1 | 10/2002 | Olden |
| 6,463,442 B1 | 10/2002 | Bent et al. |
| 6,466,203 B2 | 10/2002 | Van Ee |
| 6,470,381 B2 | 10/2002 | De Boor et al. |
| 6,473,609 B1 | 10/2002 | Schwartz et al. |
| 6,480,894 B1 | 11/2002 | Courts et al. |
| 6,487,665 B1 | 11/2002 | Andrews et al. |
| 6,496,692 B1 | 12/2002 | Shanahan |
| 6,505,238 B1 | 1/2003 | Tran |
| 6,509,913 B2 | 1/2003 | Martin et al. |
| 6,514,408 B1 | 2/2003 | Smith et al. |

| Patent | Type | Date | Inventor |
|---|---|---|---|
| 6,523,027 | B1 | 2/2003 | Underwood |
| 6,535,896 | B2 | 3/2003 | Britton et al. |
| 6,539,421 | B1 | 3/2003 | Appelman et al. |
| 6,539,501 | B1 | 3/2003 | Edwards |
| 6,542,908 | B1 | 4/2003 | Ims |
| 6,542,967 | B1 | 4/2003 | Major |
| 6,546,473 | B2 | 4/2003 | Cherkasova et al. |
| 6,546,516 | B1 | 4/2003 | Wright et al. |
| 6,556,217 | B1 | 4/2003 | Makipaa et al. |
| 6,557,038 | B1 | 4/2003 | Becker et al. |
| 6,560,598 | B2 | 5/2003 | Delo et al. |
| 6,560,618 | B1 | 5/2003 | Ims |
| 6,560,639 | B1 | 5/2003 | Dan et al. |
| 6,560,699 | B1 | 5/2003 | Konkle |
| 6,563,517 | B1 | 5/2003 | Bhagwat et al. |
| 6,563,913 | B1 | 5/2003 | Kaghazian |
| 6,564,251 | B2 | 5/2003 | Katariya et al. |
| 6,591,272 | B1 | 7/2003 | Williams |
| 6,593,944 | B1 | 7/2003 | Nicolas et al. |
| 6,601,233 | B1 | 7/2003 | Underwood |
| 6,606,418 | B2 | 8/2003 | Mitchell et al. |
| 6,609,128 | B1 | 8/2003 | Underwood |
| 6,610,105 | B1 | 8/2003 | Martin et al. |
| 6,622,168 | B1 | 9/2003 | Datta |
| 6,622,216 | B1 | 9/2003 | Lin |
| 6,633,416 | B1 | 10/2003 | Benson |
| 6,643,712 | B1 | 11/2003 | Shaw et al. |
| 6,678,518 | B2 | 1/2004 | Eerola |
| 6,687,735 | B1 | 2/2004 | Logston et al. |
| 6,697,825 | B1 | 2/2004 | Underwood et al. |
| 6,704,024 | B2 | 3/2004 | Robotham et al. |
| 6,704,728 | B1 | 3/2004 | Chang et al. |
| 6,714,794 | B1 | 3/2004 | O'Carroll |
| 6,725,219 | B2 | 4/2004 | Nelson et al. |
| 6,728,421 | B2 | 4/2004 | Kokemohr |
| 6,732,364 | B1 | 5/2004 | Bhaskaran et al. |
| 6,738,968 | B1 | 5/2004 | Bosworth |
| 6,757,708 | B1 | 6/2004 | Craig et al. |
| 6,757,899 | B2 | 6/2004 | Zhdankin et al. |
| 6,757,900 | B1 * | 6/2004 | Burd et al. ............ 719/316 |
| 6,772,261 | B1 | 8/2004 | D'Antonio et al. |
| 6,772,408 | B1 | 8/2004 | Velonis et al. |
| 6,782,403 | B1 | 8/2004 | Kino et al. |
| 6,789,105 | B2 | 9/2004 | Ludwig et al. |
| 6,792,575 | B1 | 9/2004 | Samaniego et al. |
| 6,792,605 | B1 | 9/2004 | Roberts et al. |
| 6,792,607 | B1 | 9/2004 | Burd et al. |
| 6,826,597 | B1 | 11/2004 | Lonnroth et al. |
| 6,832,263 | B2 | 12/2004 | Polizzi et al. |
| 6,836,883 | B1 | 12/2004 | Abrams |
| 6,847,333 | B2 | 1/2005 | Bokhour |
| 6,886,013 | B1 | 4/2005 | Beranek |
| 6,892,226 | B1 | 5/2005 | Tso et al. |
| 6,901,437 | B1 | 5/2005 | Li |
| 6,904,600 | B1 | 6/2005 | James et al. |
| 6,915,307 | B1 | 7/2005 | Mattis et al. |
| 6,915,454 | B1 | 7/2005 | Moore et al. |
| 6,918,107 | B2 | 7/2005 | Lucas et al. |
| 6,920,480 | B2 | 7/2005 | Mitchell et al. |
| 6,922,827 | B2 | 7/2005 | Vasilik et al. |
| 6,928,488 | B1 | 8/2005 | de Jong et al. |
| 6,944,797 | B1 | 9/2005 | Guthrie et al. |
| 6,948,174 | B2 | 9/2005 | Chiang et al. |
| 6,950,875 | B1 | 9/2005 | Slaughter et al. |
| 6,954,751 | B2 | 10/2005 | Christfort et al. |
| 6,954,854 | B1 | 10/2005 | Miura et al. |
| 6,961,750 | B1 * | 11/2005 | Burd et al. ............ 709/203 |
| 6,961,754 | B2 | 11/2005 | Christopoulos et al. |
| 6,961,776 | B1 | 11/2005 | Buckingham et al. |
| 6,964,009 | B2 | 11/2005 | Samaniego et al. |
| 6,970,935 | B1 | 11/2005 | Maes |
| 6,990,653 | B1 | 1/2006 | Burd et al. |
| 7,013,340 | B1 * | 3/2006 | Burd et al. ............ 709/229 |
| 7,016,963 | B1 | 3/2006 | Judd et al. |
| 7,028,312 | B1 | 4/2006 | Merrick et al. |
| 7,076,786 | B2 | 7/2006 | Burd et al. |
| 7,099,870 | B2 | 8/2006 | Hsu et al. |
| 7,117,504 | B2 | 10/2006 | Smith et al. |
| 7,151,966 | B1 | 12/2006 | Baier et al. |
| 7,159,007 | B2 | 1/2007 | Stawikowski |
| 7,162,723 | B2 | 1/2007 | Guthrie et al. |
| 7,171,443 | B2 | 1/2007 | Tiemann et al. |
| 7,171,454 | B2 | 1/2007 | Nguyen |
| 7,181,731 | B2 | 2/2007 | Pace et al. |
| 7,188,112 | B1 | 3/2007 | Lindquist et al. |
| 7,188,155 | B2 | 3/2007 | Flurry et al. |
| 7,216,294 | B2 | 5/2007 | Gibbs et al. |
| 7,451,352 | B1 | 11/2008 | Moore et al. |
| 7,493,397 | B1 | 2/2009 | Guthrie et al. |
| 7,594,001 | B1 | 9/2009 | Ebbo et al. |
| 2001/0013070 | A1 | 8/2001 | Sasaki |
| 2001/0027474 | A1 | 10/2001 | Nachman et al. |
| 2001/0037404 | A1 | 11/2001 | Hafsteinsson et al. |
| 2001/0047385 | A1 | 11/2001 | Tuatini |
| 2001/0054020 | A1 | 12/2001 | Barth et al. |
| 2002/0004815 | A1 | 1/2002 | Muhlestein et al. |
| 2002/0008703 | A1 | 1/2002 | Merrill et al. |
| 2002/0032701 | A1 * | 3/2002 | Gao et al. ............ 707/513 |
| 2002/0055878 | A1 * | 5/2002 | Burton et al. ............ 705/26 |
| 2002/0056085 | A1 | 5/2002 | Fahraeus |
| 2002/0062396 | A1 | 5/2002 | Kakei et al. |
| 2002/0073163 | A1 | 6/2002 | Churchill et al. |
| 2002/0078101 | A1 | 6/2002 | Chang et al. |
| 2002/0078144 | A1 | 6/2002 | Lamkin et al. |
| 2002/0083171 | A1 | 6/2002 | Hoogenboom et al. |
| 2002/0095445 | A1 | 7/2002 | alSafadi et al. |
| 2002/0107891 | A1 | 8/2002 | Leamon et al. |
| 2002/0108102 | A1 | 8/2002 | Muhlestein et al. |
| 2002/0116534 | A1 | 8/2002 | Teeple |
| 2002/0120677 | A1 | 8/2002 | Goward et al. |
| 2002/0120753 | A1 | 8/2002 | Levanon et al. |
| 2002/0129016 | A1 | 9/2002 | Christfort et al. |
| 2002/0133635 | A1 | 9/2002 | Schechter et al. |
| 2002/0138331 | A1 | 9/2002 | Hosea et al. |
| 2002/0152244 | A1 | 10/2002 | Dean et al. |
| 2002/0161923 | A1 | 10/2002 | Ndili |
| 2002/0161928 | A1 | 10/2002 | Ndili |
| 2002/0161938 | A1 | 10/2002 | Bonomo et al. |
| 2002/0188890 | A1 | 12/2002 | Shupps et al. |
| 2002/0194227 | A1 | 12/2002 | Day et al. |
| 2003/0004998 | A1 | 1/2003 | Datta |
| 2003/0009476 | A1 | 1/2003 | Fomenko et al. |
| 2003/0009519 | A1 | 1/2003 | Gosling et al. |
| 2003/0009567 | A1 | 1/2003 | Farouk |
| 2003/0018827 | A1 | 1/2003 | Guthrie et al. |
| 2003/0025728 | A1 * | 2/2003 | Ebbo et al. ............ 345/744 |
| 2003/0028565 | A1 | 2/2003 | Landsman et al. |
| 2003/0028892 | A1 | 2/2003 | Gewickey et al. |
| 2003/0066056 | A1 | 4/2003 | Petersen et al. |
| 2003/0074634 | A1 | 4/2003 | Emmelmann |
| 2003/0097639 | A1 | 5/2003 | Niyogi et al. |
| 2003/0110234 | A1 | 6/2003 | Egli et al. |
| 2003/0128235 | A1 * | 7/2003 | Chernow et al. ............ 345/744 |
| 2003/0187952 | A1 | 10/2003 | Young et al. |
| 2003/0204622 | A1 | 10/2003 | Blizniak et al. |
| 2003/0233477 | A1 | 12/2003 | Ballinger et al. |
| 2004/0003112 | A1 | 1/2004 | Alles et al. |
| 2004/0003117 | A1 | 1/2004 | McCoy et al. |
| 2004/0003139 | A1 | 1/2004 | Cottrille et al. |
| 2004/0003248 | A1 | 1/2004 | Arkhipov |
| 2004/0012627 | A1 | 1/2004 | Zakharia et al. |
| 2004/0015879 | A1 | 1/2004 | Pauw et al. |
| 2004/0030740 | A1 | 2/2004 | Stelting |
| 2004/0073873 | A1 | 4/2004 | Croney et al. |
| 2004/0172484 | A1 | 9/2004 | Hafsteinsson et al. |
| 2004/0189693 | A1 * | 9/2004 | Kenig ............ 345/736 |

| | | | |
|---|---|---|---|
| 2004/0218045 | A1 | 11/2004 | Bodnar et al. |
| 2004/0230958 | A1 | 11/2004 | Alaluf |
| 2005/0050164 | A1* | 3/2005 | Burd et al. ............... 709/217 |
| 2005/0091230 | A1 | 4/2005 | Ebbo et al. |
| 2005/0138560 | A1 | 6/2005 | Lee et al. |
| 2005/0162439 | A1* | 7/2005 | Bates et al. ............... 345/589 |
| 2005/0171967 | A1 | 8/2005 | Yuknewicz |
| 2005/0193097 | A1 | 9/2005 | Guthrie et al. |
| 2005/0203890 | A1* | 9/2005 | Chen et al. ................ 707/3 |
| 2005/0229186 | A1 | 10/2005 | Mitchell et al. |
| 2005/0251380 | A1 | 11/2005 | Calvert et al. |
| 2005/0256834 | A1 | 11/2005 | Millington et al. |
| 2005/0256924 | A1 | 11/2005 | Chory et al. |
| 2005/0256933 | A1 | 11/2005 | Millington et al. |
| 2005/0257138 | A1 | 11/2005 | Chory et al. |
| 2005/0268292 | A1 | 12/2005 | Ebbo et al. |
| 2005/0278351 | A1 | 12/2005 | Niyogi et al. |
| 2006/0004901 | A1 | 1/2006 | Burd et al. |
| 2006/0004910 | A1 | 1/2006 | Burd et al. |
| 2006/0020883 | A1 | 1/2006 | Kothari et al. |
| 2006/0095576 | A1* | 5/2006 | Perry et al. ............... 709/227 |
| 2006/0112336 | A1 | 5/2006 | Gewickey et al. |
| 2006/0130038 | A1 | 6/2006 | Claussen et al. |
| 2007/0005795 | A1 | 1/2007 | Gonzalez |
| 2007/0033533 | A1 | 2/2007 | Sull |
| 2007/0174845 | A1 | 7/2007 | Guthrie et al. |
| 2007/0214239 | A1* | 9/2007 | Mechkov et al. ........... 709/219 |

FOREIGN PATENT DOCUMENTS

| | | |
|---|---|---|
| EP | 1 111 680 | 6/2001 |
| EP | 1 156 427 | 11/2001 |
| EP | 1 156 428 | 11/2001 |
| EP | 1 156 429 | 11/2001 |
| EP | 1156415 | 11/2001 |
| EP | 1111678.7 | 4/2002 |
| EP | 1111680.3 | 4/2002 |
| EP | 1111681.1 | 4/2002 |
| EP | 1111682.9 | 4/2002 |
| EP | 1164473 | 4/2002 |
| EP | 1 156 427 | 5/2002 |
| EP | 1 241 593 | 9/2002 |
| GB | 1 367 741 | 9/1974 |
| GB | 2 339 374 | 1/2000 |
| JP | 11-098134 | 4/1999 |
| JP | 2002-24079 | 1/2002 |
| JP | 2002-41299 | 2/2002 |
| JP | 2002-49484 | 2/2002 |
| JP | 2002-49585 | 2/2002 |
| WO | WO 98/21651 | 5/1998 |
| WO | WO 98/44695 | 10/1998 |
| WO | WO 99/34288 A | 7/1999 |
| WO | WO 01/27783 | 4/2001 |
| WO | WO 01/75667 | 10/2001 |
| WO | WO 02/21343 | 3/2002 |

OTHER PUBLICATIONS

European Search Report 01111680.3-2201.
European Search Report 01111681.1- 2201.
European Search Report 01111682.9- 2201.
"Alterego Networks Introduces First Mobile Web Server for Enterprises, Telcos and Providers"; Redwood City, CA; Nov. 14, 2000; 3 pages.
Anderson, Richard; Homer, Alex; Howard, Rob; Sussman, Dave; "A Preview of Active Server Pages+"; Copyright 2000, Wrox Press, pp. 1-73.
Developing ASP-Based Applications: Microsoft 1996, 5 pages.
"Bluestone Software Layes Foundation for Internet Operating Environment with Total-E-Server . . ." Screaming Media, Business Wire; Jun. 5, 2000; 3 pages.
Chapter 3, "Mechanics of Developing JavaScript Applications"; Server-Side Javascript Guide; Online! 1999; pp. 51-108 www.developer.netscape.com/docs/mauals/ssjs/1_4/ssjs.pdf.

Chapter 6, "Session Mangement Service"; Server Side Javascript Guide; Online! 1999 pp. 125-166 www.developer.netscape.com/docs/manuals/ssjs/1_4/ssjs.pdf.
"ColdFusion: Web Application Server"; Allair Corp; www.allair.com; 1995-1999; 28 pages.
Custer, Helen; "Inside Windows NT"; Microsoft Press 1993; pp. 74-81.
Davulcu, Hasan; Freire, Juliana; Kifer, Michael; Ramakrishnan, I.V.; "A Layered Architecture for Querying Dynamic Web Content"; ACM 1999; pp. 491-502.
Dobson, Rick; "Data Binding in Dynamic HTML"; DBMS Mar. 1998 pp. 47-52.
Duan, Nick N.; "Distributed Database Access in a Corporate Environment Using Java" Bell Atlantic Corporation; 1996; 8 pages.
Esposito, Dino; "Heaven Sent"; Developer Network Journal issue 23 Mar./Apr. 2001 pp. 18-24.
Franklin, Keith; "Supercharge Data Binding"; Visual Basic Programmer's Journal, Mar. 2000; 7 pages.
Frost, Jim; "Windows NT Security"; May 4, 1995; 7 pages; http://world.std.com/~jimf/papers/nt-security/nt-security.html.
"Hammock: Think of it as Swing for the Web"; Jul. 14, 2000; 10 pages.
Hammond, Eric "Hammock Swings through Web interfaces" www.infoworld.com/articles/mt/xml/00/07/17/000717mthammock.xml; Jul. 14, 2000; 3 pages.
Holmes, John W.; e-Mail response to question regarding GET/POST. HTTP request, extracted from Google's News groups, php.general, Nov. 11, 2002.
Hovanes, Michael E.; Deal, John R. Grizz; Rowberg, Alan H.; "Seamless Multiresolution Display of Portable Wavelet-Compressed Images" Journal of Digital Imaging, vol. 12, No. 2, suppl 1 (May), 1999, pp. 109-111.
"HTML Encyclopaedia"; http://www.scit.wlv.ac.uk/encyc/form.html; 1995-1998 2 pages.
Ingham; David B; "W3Objects: A Distributed Object-Oriented Web Server" Object-Oriented Web Servers and data Modeling Workshop, Sixth International World Wide Web Conference, Apr. 1997, Santa Clara, CA, 5 pages.
Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.
Kunz, T.; El Shentenawy, M.; Gaddah, A.; Hafez, R.; Image Transcoding for Wireless WWW Access: The User Perspective; Multimedia Computing and Netorking 2002, Proceedings of SPIE vol. 467 (2002) pp. 28-33.
Marshall, James; "HTTP Made Really Easy: A Practical Guide to Writing Clients and Servers"; Aug. 15, 1997; 14 pages.
"A Brief History of Hypertext" Microsoft Corporation, 1996, 1 page.
Nadamoto, Akiyo; Kondo, Hiroyuki; Tanaka, Katsumi; "WebCarousel: Restructuring Web Search Results for Passive Viewing in Mobile Environments" IEEE 2001 p. 164-165.
"OOP Launches Hammock at JavaOne" http://www.oop.com/pr2000_06_08.jsp?gui=Plain Jun. 8, 2000, 1 page.
Pyarali, Irfan; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.
Penn, Gerald; Hu, Jianying; Luo, Hengbin; McDonald, Ryan; "Flexible Web Document Analysis for Delivery to Narrow-Bandwidth Devices"; IEEE 2001; pp. 1074-1078.
Shapiro, Marc; "A Binding Protocol for Distributed Shared Objects" Presented at 14th International Conference on Distributed Comp. Sys.; Jun. 21-24, 1994; 17 pages.
Shi, Weisong; Collins, Eli; Karamcheti, Vijay; "Modeling Object Characteristics of Dynamic Web Content"; Proceedings of the IEEE Global Internet Conference, Nov. 2002, 5pgs.
Solomon, David A. "Inside Windows NT, Second Edition"; Microsoft Press 1998; pp. 310-319.
Stewart, Tony; "The Document as Application: Issues and Implications" GCA XML Europe 1999; pp. 575-599.
"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.
Wu, Dapeng; Hou, Yiwei Thomas; Zhang, Ya-Qin; "Scalable Video Transport over Wireless IP Networks"; IEEE 2000; pp. 1185-1191.
Dowd, Tyson et al., "Compiling Mercury to the .NET Common Language Runtime," Electronic Notes in Theoretical Computer Sciences 59 No. 1 (Netherlands) (2001), pp. 1-16.
Hannay, Phillip et al., "MSIL for the .NET Framework: The Next Battleground?", Virus Bulletin Conference, Sep. 2001, pp. 173-196.
Langheinrich, M., et al., "Unintrusive customization techniques for Web advertising," Computer Networks, vol. 31, No. 11-16. May 17, 1999, pp. 1259-1272.
Lee, C.-H., et al., "Web personalization expert with combining collaborative filtering and association rule mining technique," Expert Systems With Applications, Vo. 21, No. 3, Oct. 2001, pp. 131-137.
Li, W.-S., et al., PowerBookmarks: a system for personalizable Web information organization, sharing, and management, Computer Networks, vol. 31, No. 11-16, May 17, 1999, pp. 1375-1389.
Mobasher, B., "A Web personalization Engine Based on User Transaction Clustering," Proc. Of the 9th Annual Workshop on Information Tech. And Systems, Dec. 11, 1999, pp. 179-184.
"NCSA httpd" nttpd@ncsa.uiuc.edu.
O'Leary, M., "Web personalization Does It Your Way," O'Leary Online, vol. 23, No. 2, Mar.-Apr. 1999, pp. 79-80.
Ramakrishnan, N., "PIPE: Web Personalization by Partial Evaluation," IEEE Internet Computing, vol. 4, No. 6, Nov.-Dec. 2000, pp. 21-31.
Seddon, Bill, "Generating XP Style webparts from a web control," The Code Project—Generating XP style webparts from a web control—ASP.NET, online at http://www.codeproject.com/aspnet/webpartscontrol.asp, retrieved Apr. 8, 2004, 10 pages.
Sells, Chris et al., "Generating Code at Run Time with Reflection. Emit," Windows Developer Magazine, Aug. 2002, vol. 13, No. 8, pp. 26-34.
Syme, Don, "ILX: Extending the .NET Common IL for Functional Language Interoperability," Electronic Notes in Theoretical Computer Science 59 No. 1 (2001), pp. 1-20.
Varela, Carlos A.; Caroline C. Hayes; "Providing Data on the Web: From Examples to Programs," Second International WWW Conference, Chicago, IL; Oct. 17, 1994; 17 pages.
A.D. Gordon and D Syme, Typing a Multi-Language Intermediate Code, submitted to The 28.sup.th ACM Principles of Programming Languages, (Feb. 2001), [pp. 1-9].
Abrams et al., "UIML an appliance-independent XML user interface language," Computer Networks, Elsevier Science Publishes B.V., Amsterdam, NL, vol. 31, No. 11-16, May 17, 1999, [pp. 1695-1708].
Abrams, Marc et al., "UIML: An XML Language for building Device-Independent User Interfaces," XML Conference Proceedings. Proceedings of XML, Dec. 1999, [17 pp.].
Advisory Action dated Aug. 28, 2006 in U.S. Appl. No. 10/174,348, [3 pp.].
Advisory Action dated Sep. 20, 2005 in U.S. Appl. No. 09/875,324 (now USPN 7,493,397), [3 pp.].
Aggarwal, Charu et al., "Caching on the World Wide Web" IEEE Transactions on Knowledge and Data Engineering, vol. 11, No. 1, Jan./Feb. 1999, [pp. 94-107].
Alves Dos Santos, L.M., "Multimedia Data and tools for Web services over Wireless Platforms," IEEE Personal Communications, Oct. 1998, [pp. 42-46].
Appeal Decision mailed Feb. 19, 2010 for Japanese Patent Application No. 2001-129925 (translated), [4 pp.].
Ballinger, "Fun with SOAP Extensions", Mar. 2001, MSDN, [pp. 1-5].
Chapter 1 Introduction "Java Script Language", Netscape Communications, Apr. 23, 2001, [8 pp.].
Chapter 3, "Mechanics of Developing JavaScript Applications," Server-Side Javascript Guide, 'Online! 1999, www.Developer.netscape.com/docs/manuals, ssjs/1.sub.—4/ssjs.pdf>, [pp. 51-108].
Chapter 6, "Session Management Service," Server-Side Javascript Guide, 'Online! 1999, www.developer.netscape.com/docs/manuals/ssjs/1.sub.—4/ssjs.pdf>, [pp. 125-166].
Ciancarini et al., "An extensible rendering engine for XML and HTNL", Computer Networks and ISDN System, North Holland Publishing, vol. 30, No. 1-7, Apr. 1998, [pp. 225-237].
Communication from the European Patent Office regarding Application No. 01111678.7 dated Sep. 27, 2004, [3 pp].
Communication from the European Patent Office regarding Application No. 01111678.7 dated Sep. 13, 2005, [4 pp].
Communication from the European Patent Office regarding Application No. 01111678.7 dated Sep. 27, 2006,[3 pp].
Davidson, et al., "Schema for Object-Oriented IML 2.0", Jul. 1999, W3 Consortium, [pp. 1-29].
European Search Report EP 02 00 5786, Jun. 7, 2006, [6 pp.].
European Search Report for EP 01115100, Apr. 2004, [3 pp.].
Fabre, Christian et al., Java-ANDF Feasibility Study Final Report, Mar. 26, 1997, [12 pp.].
Flammia, G., "The Wireless Internet Today and Tomorrow," IEEE Intelligent Systems, [Online] vol. 15, Sep. 2000, [pp. 82-83].
Gosling, J. et al., The Java Language Environment, A White Paper, Sun Microsystems Computer Company, Oct. 1, 1995, [pp. 1, 4-85].
Heins, et al., "Taking Your Information Into the Wireless World: Developing Information for Delivery to Mobile Devices", IEEE, Oct. 2001, [pp. 237-244].
Henglein, Fritz & Jorgensen, Jesper, Formally Optimal Boxing, Proceedings of the 21.sup.st ACM SIGPLAN-SIGACT Symposium on Principles of Programming Languages, 1994, [pp. 213-226].
Howard, "Web Services with ASP.NET", Feb. 2001, MSDN, [pp. 1-9].
Interrogation mailed on Mar. 6, 2009 for Japanese Patent Application No. 2001-129925 (translated), [56 pp].
Johnson, Andrew et al., The ANDF Technology Program at the OSF RI; Dec. 8, 1992, [6 pp].
Kaasinen Eija et al. "Two approaches to bringing internet services to WAP devices," Computer Networks and ISDN Systems, North Holland Publishing, Amsterdam, NL, vol. 33, No. 1, 2000, [pp. 231-246].
Kaffe, "Server Side Java", Jan. 16, 1998, [1 p.].
Kagal, et al., "Centaurus: A Framework for Intelligent Services in a Mobile Environment" Computer Science and Electrical Engineering, IEEE, Apr. 2001, [pp. 195-201].
Kirda, "Web Engineering Device Independent Web Services", Distributed Systems Group, IEEE, May 2001, [pp. 795-796].
Krikelis, A., "Mobile multimedia: shaping the Infoverse", IEEE Concurrency, Jan.-Mar. 1999, [pp. 7-9].
Lindholm, Tim & Yellin, Frank, The Java Virtual Machine Specification, Second Edition, Sun Microsystems, 1999, Ch. 2, [pp. 1-44].
M. Tofte and J.P. Talpin, Region-Based Memory Management, Information and Computation, 1997, vol. 132(2), [pp. 109-176].
Manual page of AR, Free Software Foundation, 1999. Retrieved from Internet on Feb. 20, 2008. Retrieved from URL: http://www.frebsd.org/cgi/man.cgi?query=ar&apropos=0&sektion=0&manpath=FreeBSD+4.8-RELEASE&format=html, [5 pp.].
Manual page of GCC, Free Software Foundation, 1998. Retrieved from Internet on Feb. 20, 2008. Retrieved from URL: http://www.freebsd.org/cgi/man.cgi?query=gcc&apropos=0&sektion=0&manp- ath=FreeBSD+4.8-RELEASE&format=html, [34 pp.].
Marshall, "HTTP Made Really Easy—A Practical Guide to Writing Clients and Servers" Aug. 15, 1997, [17 pp.].
Metadata Activity Statement, Feb. 2001, W3C, [8 pp.].
"Metadata Activity Statement", http://web.archive.org/web/20000616163950/http://www.w3.org/Metadata/Activity.html, W3C, May 8, 2000, [pp. 1-5].
Moore, M, et al. "Migrating legacy user interfaces to the internet: shifting dialogue initiative", IEEE, Nov. 23, 2000, [pp. 52-58].
Muller-Wilken S. et al.; "On integrating mobile devices into a workflow management scenario," Database and Expert Systems Applications, 2000. Proceedings 11.sup.th International Workshop on Sep. 4-8, 2000, Piscataway, NJ, USA, IEEE, [pp. 186-190].
Notice of Allowance dated Feb. 10, 2005 in U.S. Appl. No. 09/574,165 (now USPN 7,013,340), [15 pp.].
Notice of Allowance dated Jan. 12, 2007 in U.S. Appl. No. 11/165,416 (now USPN 7,415,524), [6 pp.].
Notice of Allowance dated Aug. 16, 2007 in U.S. Appl. No. 11/165,416 (now USPN 7,415,524), [5 pp.].

Notice of Allowance dated Dec. 10, 2007 in U.S. Appl. No. 11/165,416 (now USPN 7,415,524), [6 pp.].
Notice of Allowance dated Apr. 3, 2008 in U.S. Appl. No. 11/165,416 (now USPN 7,415,524), [23 pp.].
Notice of Allowance dated May 11, 2007 in U.S. Appl. No. 09/875,324 (now USPN 7,493,397), [17 pp.].
Notice of Allowance dated Mar. 14, 2008 in U.S. Appl. No. 09/875,324 (now USPN 7,493,397), [22 pp.].
Notice of Allowance dated Sep. 11, 2008 in U.S. Appl. No. 09/875,324 (now USPN 7,493,397), [5 pp.].
Notice of Allowance dated Sep. 19, 2008 in U.S. Appl. No. 09/875,324 (now USPN 7,493,397), [3 pp.].
Notice of Allowance dated Mar. 23, 2009 in U.S. Appl. No. 11/120,511 (now USPN 7,568,205), [4 pp.].
Notice of Rejection mailed on Oct. 16, 2009 for Japanese Patent Application No. 2001-129925 (translated), [5 pp.].
Office Action (Non-Final) dated Dec. 1, 2005 in U.S. Appl. No. 10/174,348, [24 pp.].
Office Action (Non-Final) dated Oct. 6, 2008 in U.S. Appl. No. 11/120,511 (now USPN 7,568,205), [45 pp.].
Office Action (Final) dated Jun. 19, 2006 in U.S. Appl. No. 10/174,348, [19 pp.].
Office Action (Non-Final) dated Dec. 21, 2006 in U.S. Appl. No. 10/174,348, [11 pp.].
Office Action (Non-Final) dated Jan. 5, 2005 in U.S. Appl. No. 09/875,324 (now USPN 7,493,397), [18 pp.].
Office Action (Final) dated Jun. 30, 2005 in U.S. Appl. No. 09/875,324 (now USPN 7,493,397), [16 pp.].
Office Action (Non-Final) dated Jan. 10, 2006 in U.S. Appl. No. 09/875,324 (now USPN 7,493,397), [12 pp.].
Office Action (Final) dated Jul. 12, 2006 in U.S. Appl. No. 09/875,324 (now USPN 7,493,397), [16 pp.].
Office Action (Non-Final) dated Nov. 17, 2006 in U.S. Appl. No. 09/875,324 (now USPN 7,493,397), [13 pp.].
Office Action (Non-Final) dated Jan. 2, 2008 in U.S. Appl. No. 11/120,511 (now USPN 7,568,205), [10 pp.].
Office Action (Non-Final) dated Sep. 18, 2006 in U.S. Appl. No. 11/165,416 (now USPN 7,415,524), [6 pp.].
Official Notice of Final Decision of Rejection mailed on Oct. 17, 2006 for Japanese Patent Application No. 2001-129925 (translated), [7 pp.].
Official Notice of Rejection mailed on Mar. 3, 2006 for Japanese Patent Application No. 2001-129925 (translated), [10 pp.].
Office Action (Non-Final) dated Jun. 6, 2003 in U.S. Appl. No. 09/574,165 (now USPN 7,013,340), [15 pp.].
Office Action (Final) dated Dec. 4, 2003 in U.S. Appl. No. 09/574,165 (now USPN 7,013,340), [14 pp.].
Office Action (Non-Final) dated Mar. 30, 2004 in U.S. Appl. No. 09/574,165 (now USPN 7,013,340), [14 pp.].
Office Action (Final) dated Oct. 22, 2004 in U.S. Appl. No. 09/574,165 (now USPN 7,013,340), [5 pp.].
Partial European Search Report for EP 02 00 5786, Oct. 12, 2005, [5 pp.].
Peeling, Dr. N. E., ANDF Features and Benefits, Feb. 5, 1993, [9 pp.].
Platt, "Thunderclap, the Newsletter of Rolling Thunder Computing", dated to Aug. 2001, vol. 3, No. 2, [pp. 1-18].
Rational, Rose/C++, Rational Software Corporation, whole manual, released 1996, [210 pp.].
Ren, Robin, "Practical Active Server Pages Technique: Porting Windows CGI Applications to ASP", Microsoft Interactive Developer, No. 10, ASCII Corporation, Nov. 18, 1998 (CSDB: Technical Journal in Japan 2000001200009), [pp. 89-98].
Response to Office Action (Non-Final) dated Dec. 18, 2006 in U.S. Appl. No. 11/165,416 (now USPN 7,415,524), [14 pp.].
Response to Office Action (Non-Final) dated Mar. 1, 2006 in U.S. Appl. No. 10/174,348, [13 pp.].
Response to Office Action (Final) dated Aug. 17, 2006 in U.S. Appl. No. 10/174,348, [15 pp.].
Response to Office Action (Non-Final) dated Apr. 5, 2005 in U.S. Appl. No. 09/875,324 (now USPN 7,493,397), [12 pp.].
Response to Office Action (Final) dated Aug. 19, 2005 in U.S. Appl. No. 09/875,324 (now USPN 7,493,397), [13 pp.].
Response to Office Action (Non-Final) dated Apr. 10, 2006 in U.S. Appl. No. 09/875,324 (now USPN 7,493,397), [12 pp.].
Response to Office Action (Final) dated Sep. 12, 2006 in U.S. Appl. No. 09/875,324 (now USPN 7,493,397), [11 pp].
Response to Office Action (Non-Final) dated Feb. 16, 2007 in U.S. Appl. No. 09/875,324 (now USPN 7,493,397), [17 pp].
Response to Office Action (Non-Final) dated Jul. 2, 2008 in U.S. Appl. No. 11/120,511 (now USPN 7,568,205), [17 pp].
Response to Office Action (Non-Final) dated Feb. 6, 2009 in U.S. Appl. No. 11/120,511 (now USPN 7,568,205), [16 pp].
Response to Office Action (Non-Final) dated Sep. 4, 2003 in U.S. Appl. No. 09/574,165 (now USPN 7,013,340), [20 pp].
Response to Office Action (Non-Final) dated Feb. 12, 2004 in U.S. Appl. No. 09/574,165 (now USPN 7,013,340), [23 pp].
Response to Office Action (Non-Final) dated Jun. 3, 2004 in U.S. Appl. No. 09/574,165 (now USPN 7,013,340), [24 pp].
Response to the Communication from the European Patent Office regarding Application No. 01111678.7 dated Feb. 5, 2007, [12 pp].
Response to the Communication from the European Patent Office regarding Application No. 01111678.7 dated Jan. 24, 2005, [8 pp].
Response to the Communication from the European Patent Office regarding Application No. 01111678.7 dated Jan. 20, 2006, [18 pp].
Response to Office Action (Final) dated Jan. 20, 2005 in U.S. Appl. No. 09/574,165 (now USPN 7,013,340), [13 pp.].
S. Peyton Jones and J. Launchbury, Unboxed Values as First Class Citizens, In Functional Programming Languages and Computer Architecture, vol. 523 of Lecture Notes in Computer Science, Springer Verlag, 1991, [pp. 636-666].
Shao, Zhong, Flexible Representation Analysis, Proceedings of the Second ACM SIGPLAN International Conference of Functional Programming, 1997, [pp. 85-98].
SNAP Using the SNAP Language, Template Software, Chapter 7, published 1997, [35 pp.].
"Software Systems Construction with Examples in ADA," Bo Sanden, published 1994, [pp. 104-109].
"Spyglass Prism 3.1 Supports the latest Standards for Transmission of Content to Wireless Devices," Internet citation, Jul. 5, 2000, [1 p.].
Standard Output of Common, 'ar': contents of '/usr/lib/libbz2.A', print out of files in '/usr/lib/libbz2.a', [14 pp.].
Thiemann, Peter, Unboxed Values and Polymorphic Typing Revisited, Proceedings of the Seventh International Conference On Functional Programming Languages and Computer Architecture, 1995, [pp. 24-35].
Tuecke, "MPI Developers Conference Summary", 1996, [11 pp.].
U.S. Appl. No. 09/570,071, Smith, et al., [52 pp.].
U.S. Appl. No. 11/184,094, Guthrie, et al., [30 pp.].
Visual Object-Oriented Programming, M. Burnett et al., published 1994, [pp. 1-42, 199-274].
W3C, Soap Version 1.2 Specification Jul. 9, 2001 Working Draft, Jul. 2001, [5 pp.].
"Web Services Description Language (WSDL)", Mar. 2001, W3C, [1 p.].
Winer, Dave, "XMP RPC Specification", Jun. 15, 1999, [8 pp.].
X. Leroy, Unboxed Objects and Polymorphic Typing, in 19.sup.th ACM SIGPLAN-SIGACT Symposium on Principles of Programming Languages, ACM Press, 1992, [pp. 177-188].
Y.G. Park and B. Goldberg, Escape Analysis On Lists, in ACM SIGPLAN on Programming Language Design and Implementation, ACM Press, 1992, [pp. 116-127].
Yoshikawa, Kazuhiro, et al. "Expanding a System via the Internet: Construction/Operation Points to be Considered: Exploring a Construction/Operation for Improving Reliability and Security", Nikkei Open Systems, No. 63, Nikkei Business Publications, Inc. Jun. 15, 1998 (CSBD: Technical Journal in Japan 199800933009), [pp. 182-191].

* cited by examiner

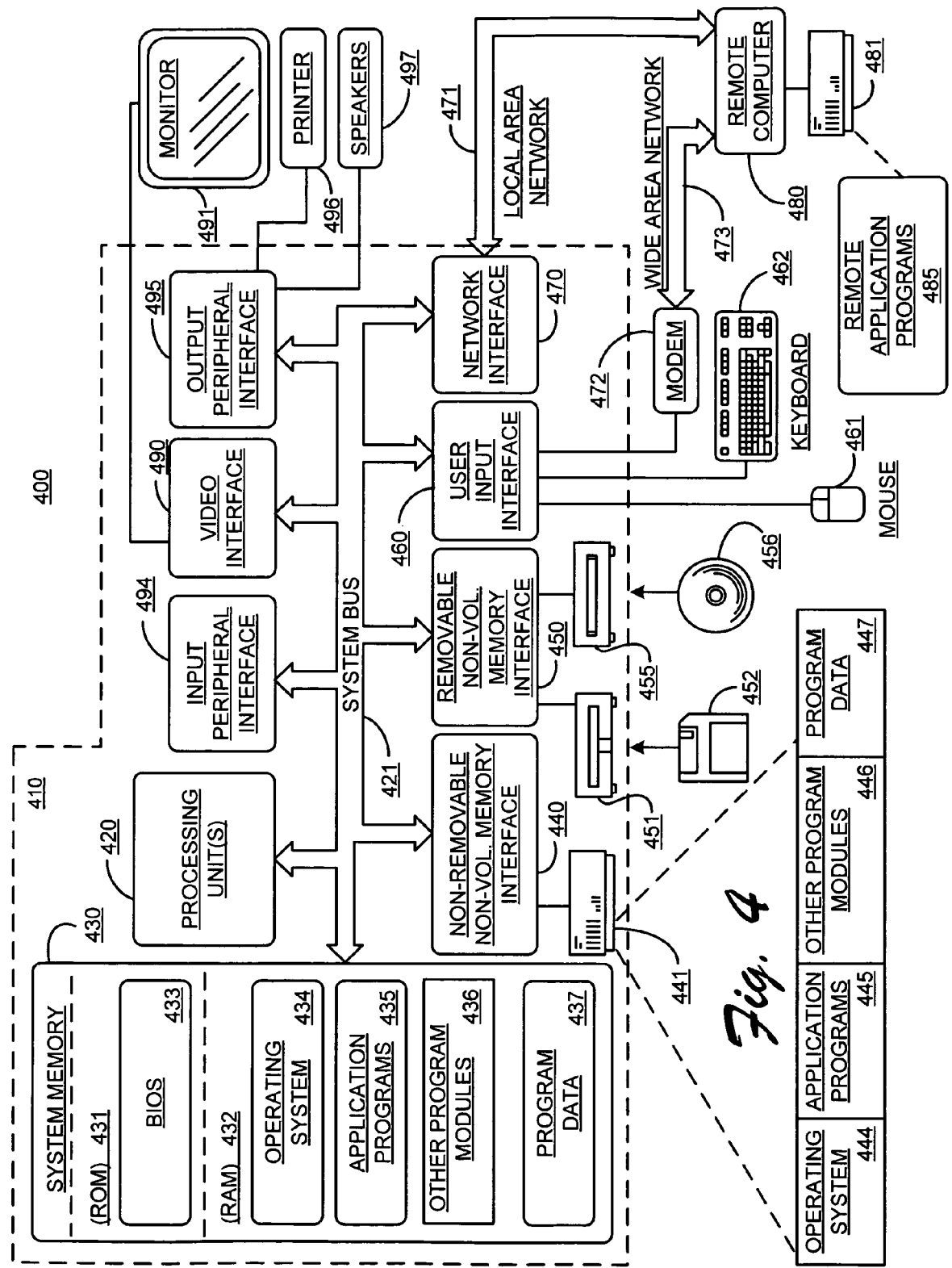

US 7,890,604 B2

CLIENT-SIDE CALLBACKS TO SERVER EVENTS

RELATED APPLICATIONS

This patent application is related to the following patent applications, each of which are commonly assigned to assignee of this application, and hereby incorporated by reference:

U.S. patent application Ser. No. 09/574,165, titled "Postback Input Handling by Server-Side Control Objects", filed on May 18, 2000, commonly assigned to the assignee hereof, and hereby incorporated by reference;

Japanese Patent Application no. 2001/129925, titled "Postback Input Handling by Server-Side Control Objects", filed on Apr. 26, 2001, and commonly assigned to the assignee hereof; and European Patent Application no. 01/111678.7, titled "Postback Input Handling by Server-Side Control Objects", filed on May 14, 2001, and commonly assigned to the assignee hereof.

TECHNICAL FIELD

Systems and methods of the invention relates to server-based Web applications.

BACKGROUND

Creating Web applications that respond to user requests quickly, even when a large number of requests are being processed on the server, has been a challenge for developers and IT personnel since the Internet began. Response time is the amount of time that elapses from when a client request is communicated to a server, and when the response from the server becomes interactive at the client. When an application takes a long time to respond, the user may become impatient and go to another Web site. Ideally, the client experience should appear to be that of a continuously executing process. Unfortunately, most Web Form events require communicating a substantial amount of information to the server for processing, and communicating a substantial amount of information in a response back to the client (a round trip). Such round trips often result in long response times, causing unresponsive applications and distracting user experiences.

This amount of time that it takes to perform a round trip is exacerbated because events raised by server-based Web application server controls work somewhat differently than events in traditional client forms or in client-based applications. The difference arises primarily because of the separation of the event itself from where the event is handled. In client-based applications, events are raised and handled on the client. In server-based Web Forms pages, on the other hand, events associated with server controls are raised on the client but handled on a Web server.

For events raised on the client (typically click events), the Web Forms control event model requires that the Web Form and the event information be captured on the client, encapsulated in an event message, and sending the event message to the server via a full HTTP post of the page. The page framework on the server must interpret the post to determine what event occurred and then call the appropriate server method(s) to handle the event. Once the event has been processed, the server generates a completely new page with the server controls associated with the client-side user interface (UI) elements by rendering the HTML data for each of the client-side UI elements. The server then performs a full page postback of the newly rendered page—an entire new Web Form—to the client in an HTTP response. This means that for each action that requires processing, the entire form must be submitted to the server, the entire form must be recreated, processed, and returned in a full page postback to the client. This sequence of events is called a round trip.

For example, imagine a business scenario: A user enters an order on a Web Forms page ("page"). Responsive to order entry, and to confirm sufficient inventory for the order, an application posts the page to the server at an appropriate point in the user's order-entry process. The server receives the post, identifies resources of the page, generates a control object hierarchy for the identified resources, examines the order, performs an inventory lookup, perhaps takes some action defined in business logic (such as modifying the page to indicate an error), and based on the results of the order entry in view of the business logic, renders the resulting page HTML for client-side presentation. At this point, the server returns the page in a full page postback to the browser for the user to continue.

In view of the above, full Web page submittals and full Web page postbacks for a server to handle a client application event are substantially problematic in that they typically result in a non-responsive application, which in turn generally leads to a poor user experience. To make matters worse, each full page post to a Web server to handle a client-side event may add an extraneous step to an application's page navigation history. For example, consider that a full page post by a Web browser application to a Web server creates an irrelevant step in the page's navigation history. In this scenario, if a user selects the browser's "back" navigation button, the browser will present a previous rendering of the same page, which is not the "real" previous page. As can be appreciated, generating such an extraneous navigation step in a page's navigation history responsive to a full page post is a substantial waste of processing power, resources, time, and can be confusing and frustrating to a user of the application. Accordingly, systems and methods to facilitate the appearance of a continuously executing process to a user when processing Web page events that do not generate extraneous page navigation steps, would be welcomed.

SUMMARY

Systems and methods for client-side callbacks to server events are described. In one aspect, a Web server receives a message indicating a client-side event. The client-side event is associated with a specific component of a client resource. The specific component is one of multiple static components of the client resource. A server-side component generates a response to the message. The server-side component implements at least a subset of logic of the specific component. Server-side logic corresponding to other ones of the static components that are different than the specific component is not used to generate the response.

BRIEF DESCRIPTION OF THE DRAWINGS

In the figures, the left-most digit of a component reference number identifies the particular figure in which the component first appears.

FIG. 4 shows an exemplary suitable computing environment on which the subsequently described systems, apparatuses and methods for client-side callbacks to server events may be fully or partially implemented.

DETAILED DESCRIPTION

Overview

Figure 1:
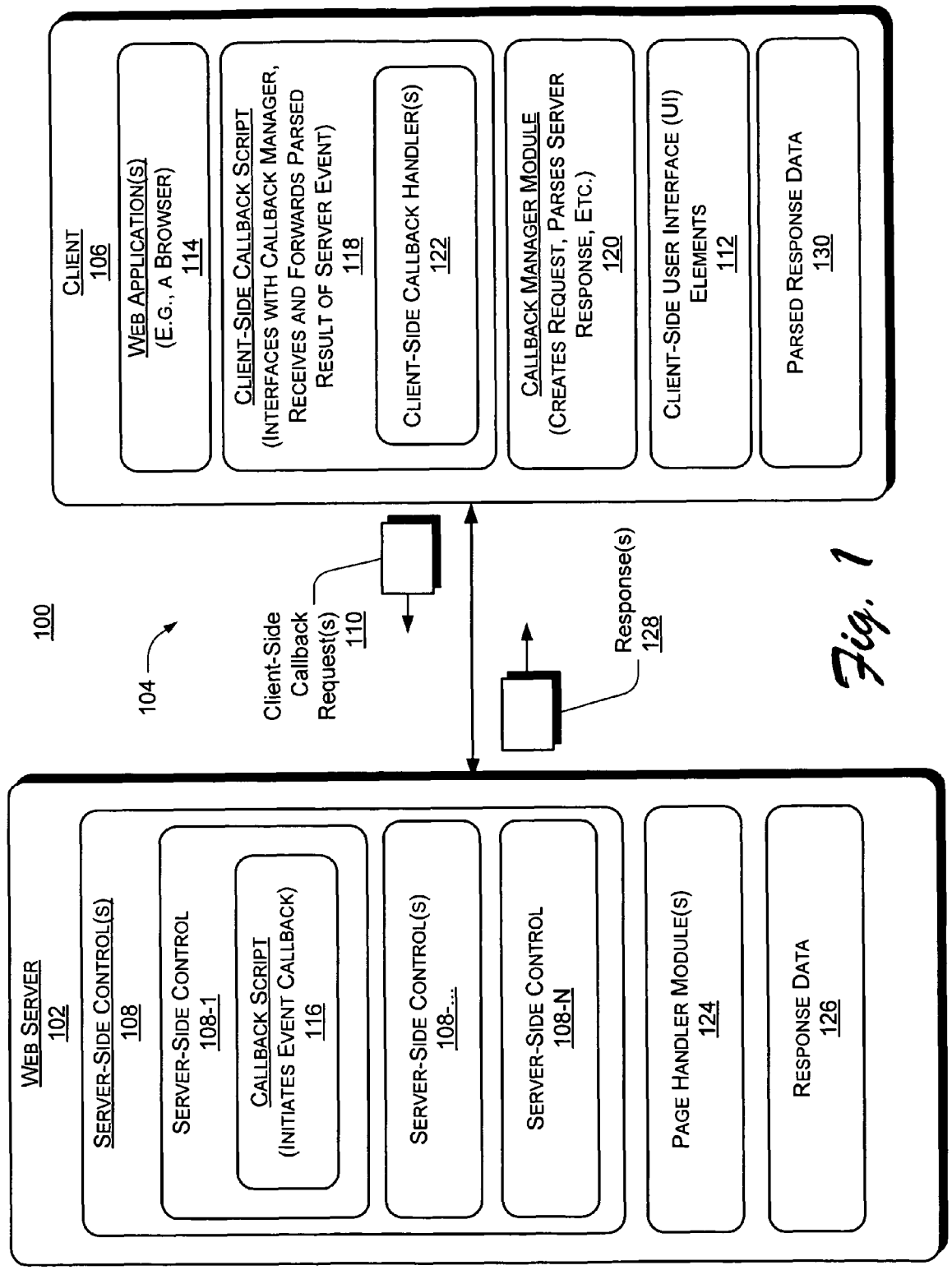
FIG. 1 illustrates an exemplary system for client-side callbacks to server events.

The following systems and methods for client-side callbacks to server events provide a framework to facilitate the appearance of a continuously executing process to a user when processing Web Forms events. More particularly, the framework provides a mechanism by which Web page code (Web Form(s)) in a client device or browser can invoke server-side code in a Web site and handle the server returned result in a client-side callback method. This framework for raising and handling events does not require that the client submit the full page that corresponds to the event to the server. Rather, only an event and a set of targeted server-side controls for handling the event and generating a response are identified in the client request for the server to handle a client-side event—although, as described below, other information can be included in the request as well.

Responsive to receiving a client-side event handling request, the server executes—through a server-side event—only enough of the page's lifecycle to process the event. This means that the entire page is not pre-rendered and rendered in response to the client-side event request. Only the one or more server-side controls identified in the client-side event handle the request, and any other controls (e.g., children controls) specified by the one or more server-side controls, will respond to the event and communicate any data back to the client. The content and data format of the data generated in response to the client-side event is completely a function of the design of the server-side control(s) used to process the event at the server.

These techniques for processing a client-side event allow the server to more efficiently process Web Forms events, for example, as compared to conventional techniques that always execute full post-back page lifecycles, including pre-rendering and rendering operations for all page controls. Not only does this reduce the amount of time that the server needs to process an event message, but this approach also means that the page does not need to be fully refreshed on the client, allowing a user to continue to interact with other controls on a page that are not being updated responsive to the client-side event. Additionally, since a client-side event involving a client-side control does not result in a full post-back of a page, irrelevant steps in the corresponding page's navigation history are not generated. Each of these behaviors preserve a quality user experience on the client by providing the user with a less distracting and more responsive Web application experience.

These and other aspects of the systems and methods for client-side callbacks to server events are now described in greater detail.

An Exemplary System

Turning to the drawings, wherein like reference numerals refer to like elements, the systems and methods for client-side callbacks to server events are described and shown as being implemented in a suitable computing environment. Although not required, the invention is described in the general context of computer-executable instructions (program modules) being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows system 100 for client-side callbacks to server events. In this implementation, system 100 includes Web server 102 coupled across network 104 to client computing device 106. Communications between Web server 102 and client 106 occur over network 104. In one implementation, such communications are conducted using a sequence of HTTP requests and HTTP responses. In another implementation, other transport protocols, for example, S-HTTP, and/or the like, is used for communications between the server and the client. Network 104 may include any combination of a local area network (LAN) and general wide area network (WAN) communication environments, such as those which are commonplace in offices, enterprise-wide computer networks, intranets, and the Internet.

Web server 102 creates one or more server-side controls 108 providing server-side processing of client-side callback requests 110 (hereinafter often referred to simply as "request(s) 110") from client computing device 106. Server-side control(s) 108 provide visual elements (e.g., HTML and static text) and program logic for one or more Web Form(s) presented at client 106. The visual elements logically correspond to client-side user interface (UI) elements 112. For instance, server-side control(s) 108 generate authoring language codes, or markup language, for use by a Web application 114 (e.g., a Web browser) executing on client 106 to display and process client-side UI elements 112, for example, as a Web page.

With respect to program logic provided by server-side control(s) 108, code behind class files for client-side user interface (UI) elements 112 is selectively executed at Web server 102 whenever a corresponding Web Forms page is requested by client 106. Moreover, in this implementation, server-side control(s) 108 capable of handling client-side events inject callback script 116 onto a persisted form for respective visual elements at the client 106. Callback script 116 acts as an intermediary between client-side generated events associated with client-side UI elements 112 and server-side events created at Web server 102 to process client-side events. Callback script 116 is injected/rendered to client 106 so that client-side event(s) to retrieve data from Web server 102 can be generated without causing an entire Web page to post back from Web server 102. Only a server-side control 108 designed to process client-side callback events implement callback script 116. For purposes of illustration, callback script 116 which has been rendered to client 106 logically corresponds to client-side callback script 118 at client 106.

Client-side callback script 118, responsive to a client-side event (e.g., a click or select event on a static or visual element presented by Web application 112 to a user), interfaces with callback manager module 120 to generate out-of band request 110. For purposes of discussion, an out-of-band request is one that does not result in a full page postback from Web server 102. Client-side callback request 110 identifies the client-side event and the control(s) (i.e., server-side control(s) 108) targeted to handle the client-side event. As described below, a control configured to handle a client-side event implements a RaiseCallbackEvent application programming interface (API). Request 110 may include additional information generated by client-side UI elements 112 associated with the client-side event and/or the Web application 114 responsive to the client-side callback event. In one implementation, request 120 is an HTTP request to a Universal resource Identifier (URI). In this implementation, Web server 102 provides callback manager 120 to client 106, for example, during an initial rendering of a page that is based on a server control 108 that handles client-based callback events.

As described below, Web server 102 will process the client-side callback event associated with request 120 by communicating encapsulated information to the server-side control(s) 108 identified by request 120 (e.g., see the GetCallBackEventReference "Control" parameter). The identified control(s) generate data to process the indicated event and respectively communicate the data back to callback manager 120 via a response 128. Callback manager 120, responsive to receiving response 128, parses the data (response data 126) in response 128 to generate parsed response data 130. Callback manager 120 passes parsed response data 130 to the specific client-side callback handler 122 that was specified by the Web application 114 with the GetCallbackEventReference method.

Exemplary Callback Manager and Client-Side Callback Script APIs

During rendering of a page, each server-side control 108 that handles a client-side callback event renders code (e.g., script) for execution at the client 106. The code includes a call to Page.GetCallbackEventReference( . . . ) to obtain a name of a client-side method to invoke a corresponding client-side callback event. The client-side method is implemented in the callback manager module 120 and provides both the functionality to package a callback request 110 to the server 102 and parse a callback response 128 from the server 102.

TABLE 1

| EXEMPLARY API TO OBTAIN A CALLBACK EVENT REFERENCE |
|---|
| public class Page { <br>     public string GetCallbackEventReference(Control control, string <br>         argument, string clientCallback, string context); <br>     public string GetCallbackEventReference(Control control, string <br>         argument, string clientCallback, string context, string <br>         clientErrorCallback); <br>     public string GetCallbackEventReference(string target, string <br>         argument, string clientCallback, string context, string <br>         clientErrorCallback); <br> } |

GetCallbackEventReference will return a string which when treated as script on the client initiates a client callback. In this implementation, the GetCallbackEventReference has the following parameter overloads, each of which is designed to hook up the events in a different respect: Tables 2, 3, and 4 provide exemplary overload implementations of the GetCallbackEventReference API.

TABLE 2

GetCallBackEventReference(control, argument, clientCallBack, context)

| | |
|---|---|
| Prototype | Public string GetCallbackEventReference(Control control, string argument, string clientCallback, string context); |
| Control | The Control which implements RaiseCallbackEvent. |
| Argument | In one implementation, this is client-side script that will be executed prior to making the call back. The evaluation of this script (on the client) will be sent to the RaiseCallbackEvent method via the eventArgument parameter. In another implementation, this is a static value. |

TABLE 2-continued

GetCallBackEventReference(control, argument, clientCallBack, context)

| | |
|---|---|
| clientCallback | Name of the client side event handler (i.e., client-side callback handler 122) which will receive the result of a successful server event. |
| Context | In one implementation, this is client-side script that will be evaluated on the client prior to the CallBack. The result of this will be passed back to the client side event handler via the context parameter. In another implementation, this is a static value |

TABLE 3

GetCallBackEventReference(control, argument, clientCallBack, context, ClientErrorCallBack)

| | |
|---|---|
| Prototype | public string GetCallbackEventReference(Control control, string argument, string clientCallback, string context, string clientErrorCallback); |
| Control | The Control which implements RaiseCallbackEvent. |
| Argument | Client Side Script that will be executed prior to making the call back. The evaluation of this script (on the client) will be sent to the RaiseCallbackEvent method via the eventArgument parameter. |
| clientCallback | Name of the client side event handler which will receive the result of a successful server event. |
| Context | Client Side Script that will be evaluated on the client prior to the CallBack. The result of this will be passed back to the client side event handler via the context parameter. |
| clientErrorCallback | Name of the client side event handler which will receive the result of the RaiseCallbackEvent method when an error occurs. |

TABLE 4

GetCallBackEventReference(target, argument, clientCallBack, context, ClientErrorCallBack)

| | |
|---|---|
| Prototype | public string GetCallbackEventReference(string target, string argument, string clientCallback, string context, string clientErrorCallback); |
| Target | This is for the developer who wants the callback to go to something other than the server control's corresponding client-side control. |
| Argument | Client Side Script that will be executed prior to making the call back. The evaluation of this script (on the client) will be sent to the RaiseCallbackEvent method via the eventArgument parameter. |
| clientCallback | Name of the client side event handler XXX which will receive the result of a successful server event. |
| Context | Client Side Script that will be evaluated on the client prior to the CallBack. The result of this will be passed back to the client side event handler via the context parameter. |
| clientErrorCallback | Name of the client side event handler which will receive the result of the RaiseCallbackEvent method when an error occurs. |

The clientCallback parameter specifies the name of the client-side callback handler 122 which will receive the result of a successful server-side event. In this implementation, the client-side callback handler 122 has the following signature, wherein function name "MyCallback" is an arbitrary name:

TABLE 5

AN EXEMPLARY CLIENT-SIDE CALLBACK HANDLER

```
<script>
    function MyCallback(result, context) { ... }
</script>
```

Web Server Handling of a Client Callback Event Request

In this implementation, a server-side control 108 (component) capable of handling callback events is invoked via an ICallBackEventHandler interface. This interface has a single RaiseCallbackEvent method. The RaiseCallbackEvent method may accept an optional argument that contains information relevant to processing the event.

TABLE 6

AN EXEMPLARY CALLBACK EVENT HANDLER INTERFACE

```
namespace System.Web.UI {
    public interface ICallbackEventHandler {
        string RaiseCallbackEvent(string eventArgument);
    }
}
```

The RaiseCallbackEvent method returns a string of data that is passed back by callback manager module 120, and from callback manager 120 to the previously specified client-side callback handler 122 (see, the GetCallbackEventReference API).

In view of the above APIs, Web server 102 responsive to receiving a request 110, raises a server-side event by invoking one or more corresponding RaiseCallbackEvent methods. To this end, Web server 102 resolves the URI of request 110 and invokes an appropriate page handler 124. For example, if the URI specifies a dynamic content resource, e.g., an Active Server Page+(ASP.NET) resource, page handler 124 accesses the dynamic content resource by instantiating the specified page/Web Forms along with the page's hierarchy of server-side control(s) 108. The page handler 124 execute only enough of the page's lifecycle events to handle/process the client-side event. Exemplary such page lifecycle events include page initialization, loading, and invocation of respective server-side control(s) 108 configured to manage the client-side event by invoking one or more corresponding RaiseCallbackEvent methods. As indicated, the respective server-side controls are specified by request 110. The invoked server-side control(s) 108 generate response data 126. Thus, response data 126 is generated only by select ones of the server-side control(s) 108 (and possibly children of these select ones or other server-side controls invoked by one or more of the select ones) that were specified in request 110.

For instance, a hierarchy of server-side control(s) 108 associated to a server-side control 108 specified in request 110 may cooperate in processing response data 126. Although response data 126 can include markup language for one or more UI elements corresponding to server-side control(s) 108 that implement logic of the page, response data 126 can be any type of data in any type of data format, the type of data and data format being a function of respective design of the server-side control(s) 108 that generated response data 126. For example, in one implementation, a server-side control 108 generates response data 126 for updating a text string in a dialog box.

Page handler 124 packages response data into response 128, which in one implementation is an HTTP request, and communicates response 128 back to callback manager 120. Each server-side control 108 can generate response data 126, which can be packaged by page handler module 124. Callback manager 120 can un-package the response data 126 and call the appropriate callback handlers 122. As indicated above, responsive to receiving response 128, callback manager 120 parses response data 126 encapsulated in response 128 to generate parsed response data 130. Callback manager 120 passes parsed response data 130 to the specific client-side callback handler 122 that was specified by the particular server-side controls 108 that generated the response data 126 with the GetCallbackEventReference method.

An Exemplary Procedure

Figure 2:
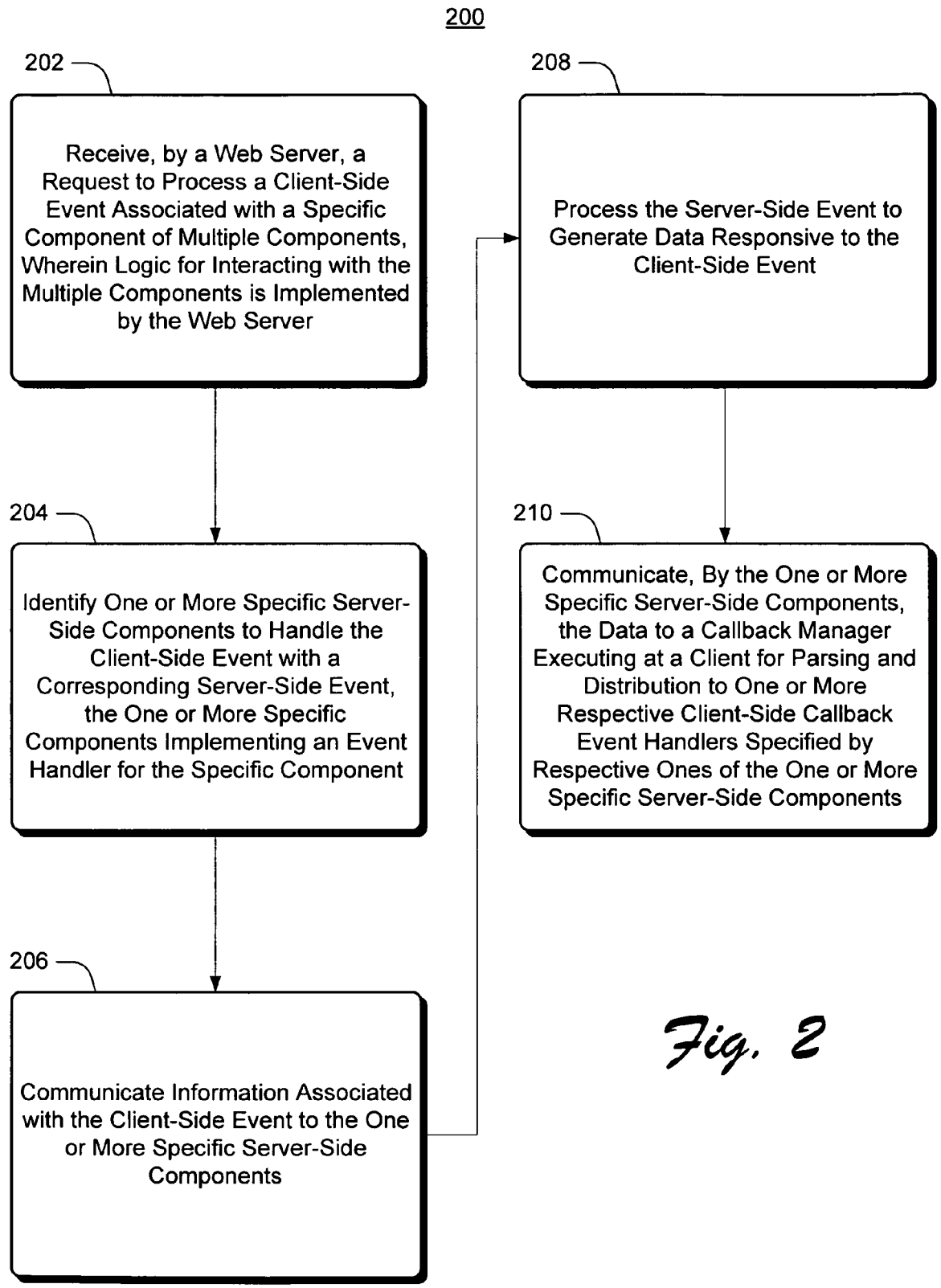
FIG. 2 illustrates an exemplary procedure for Web server aspects fof client-side callbacks to server events.

FIG. 2 illustrates an exemplary procedure 200 for Web server aspects of client-side callbacks to server events. For purposes of discussion, operations of the procedure are discussed in relation to the components of FIG. 1. (All reference numbers begin with the number of the drawing in which the component is first introduced). At block 202, Web server 102 (FIG. 1) receives a client-side callback request 110. The request 110 is associated with a client-side event and a specific component of multiple components of a resource hosted by client 106. For example, if the specific component is a button control, the event may be a mouse click or user select event. In one implementation, the multiple components comprise a Web page being presented on client 106 by a Web application 114, for example, a Web-based browser application. Program logic for interacting with respective ones of the multiple components is implemented by server-side controls 108 at the Web server 102. For example, although respective ones of server-side controls 108 (i.e., server-side controls that logically correspond to the specific component at client 106 in associated with the event) handle or process the event associative with request 110, the respective ones are also responsible for rendering callback script 116 to client 106 to enable the specific component to interface with Web server 102 to process the client-side event.

At block 204, Web server 102, and more particularly a page handler module 124, identifies one or more specific server-side components 108 to process the client-side event specified by request 110. As indicated above, the one or more specific server-side components will be components logically corresponding to the specific component at client 106 responsible for firing the event. To facilitate identification of these corresponding components, request 110 identifies that targeted one or more specific server-side components 108. At block 206, page handle or 124 communicates information from request 110 to the one or more identified server-side controls 108—this communication is a server-side event. The communicated information corresponds to the client-side event.

At block 208, and responsive to receiving the information from page handler 124, respective ones of the identified server-side controls 108 process the client-side event to generate a set of response data 126. At block 210, respective ones of the identified server-side controls 108 communicate the response data 126 via response(s) 128 to a callback manager module 120 executing at client 106. The callback manager 120 is configured to parse response(s) 128 and forward resulting parsed response data 130 to respective client-side callback event handlers 122. The client-side callback event handlers were specified by the respective ones of the identified server-side controls 108 during an initial rendering of logically corresponding client-side user interface elements 112 for presentation at client 106.

Figure 3:
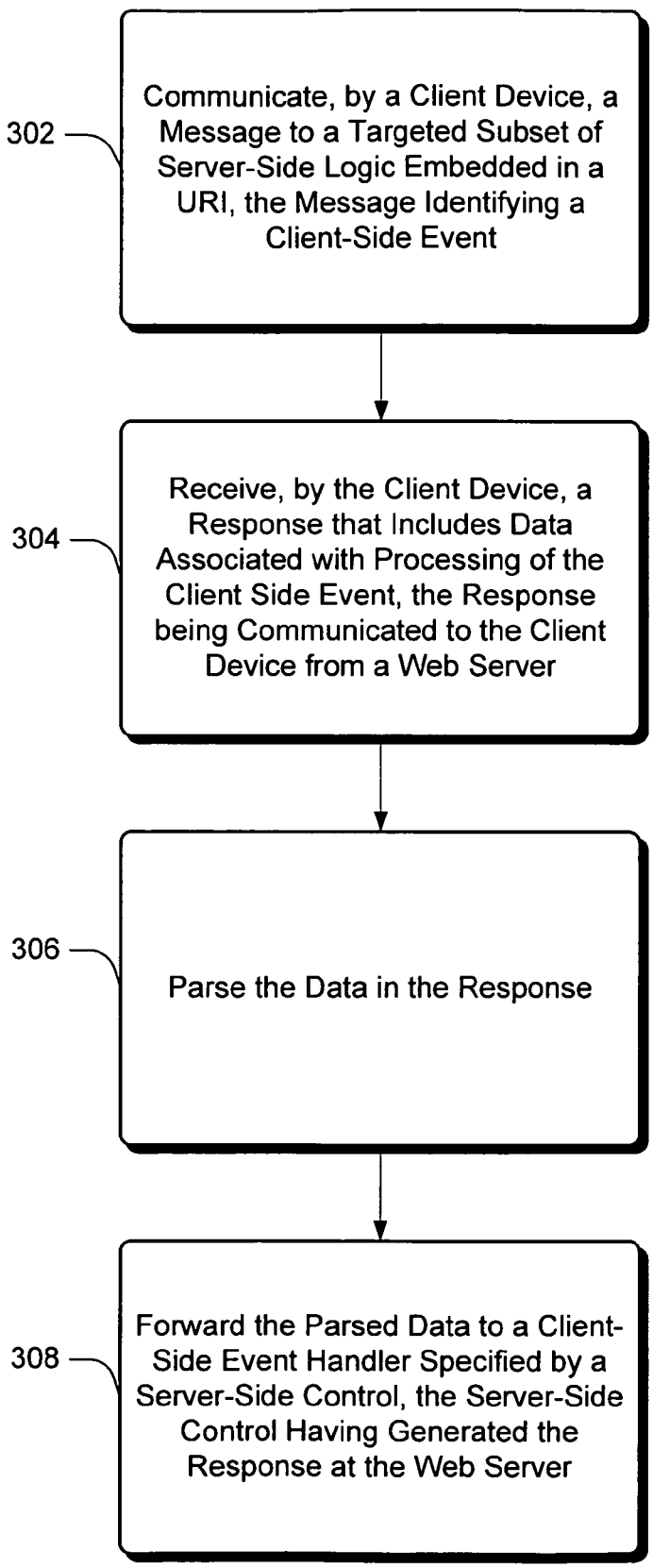
FIG. 3 illustrates an exemplary procedure for client computing device (client-side) aspects for client-side callbacks to server events.

FIG. 3 illustrates an exemplary procedure 300 for client computing device (client-side) aspects for client-side callbacks to server events. At block 302, client 106 (FIG. 1) communicates a message (client-side event request 110) to a targeted subset of server-side logic embedded in a Universal Resource Indicator (URI). The message identifies a client-side event. The targeted subset logically corresponds to a specific component hosted by client 106, wherein the specific component has executed client-side callback script 118 to communicate the message to the URI. The client-side callback script 118 was injected into a rendering of the specific component by one or more components of the targeted subset of server-side logic. In one implementation, the specific component is a client-side user interface element 112. The URI is implemented at Web server 102.

At block 304, client device 106 receives a response 128 that includes response data 126 associated with processing of the client-side event. The response 128 was communicated to client 106 from Web server 102. In one implementation, the response is received by a callback manager module 120. At block 306, the callback manager module 120 parses response data 126 in the response 128 to generate parsed response data 130. At block 308, the callback manager module 120 forwards the parsed response data 130 to a client-side callback handler 122. Logic for specifying and hooking into the client-side callback handler 122 by the callback manager 120 was specified prior to the callback-event by the one or more components of the targeted subset of server-side logic.

An Exemplary Operating Environment

FIG. 4 illustrates an example of a suitable computing environment 400 on which the system 100 of FIG. 1 and the methodology of FIGS. 2 and 3 for client-side callbacks to server events may be fully or partially implemented. Exemplary computing environment 400 is only one example of a suitable computing environment and is not intended to suggest any limitation as to the scope of use or functionality of systems and methods the described herein. Neither should computing environment 400 be interpreted as having any dependency or requirement relating to any one or combination of components illustrated in computing environment 400.

The methods and systems described herein are operational with numerous other general purpose or special purpose computing system environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 4, an exemplary system for client-side callbacks to server events includes a general purpose computing device in the form of a computer 410. The following described aspects of computer 410 are exemplary implementations of server 102 (FIG. 1) and/or client 106. Components of computer 410 may include, but are not limited to, processing unit(s) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 410 typically includes a variety of computer-readable media. Computer-readable media can be any available media that can be accessed by computer 410 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example and not limitation, FIG. 4 illustrates operating system 434, application programs 435, other program modules 436, and program data 437. In one implementation, application programs 435 include server-side controls(s) 108 and page handler module(s) 124. In this same scenario, program data 437 includes response data 128 and response(s) 128. In another implementation, application programs 435 include Web application(s) 114, client-side callback script 118, and callback manager module 120. In this same scenario, program data 437 includes client-side callback request(s) 110, client-side user interface elements 112, and parsed response data 130.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that they are at least different copies.

A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495. The computer 410 may also include an input peripheral interface 494.

The computer 410 operates in a networked environment using logical connections to one or more remote computers, such as a remote computer 480. The remote computer 480 may be a personal computer, a server, a router, a network PC, a peer device or other common network node, and as a function of its particular implementation, may include many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 485 as residing on memory device 481. The network connections shown are exemplary and other means of establishing a communications link between the computers may be used.

CONCLUSION

Referring to FIG. 1, client-side callback script (s) 114 and client-side callback framework 118 allow a Web application 114 using the client-side UI elements 112 to send request 110 to Web server 102, for example, to retrieve data, without requiring Web server 102 to postback an entire Web page, or Web Form, to the client 106. By designing and using client-side callback script 114 during design of a server-side control 108, a programmer enables a Web application 114 to call Web server 102, execute a server event, receive a response 128 including corresponding event data, and use the event data in any manner to facilitate operations of the Web application 114. A server-side control developer is abstracted away from the creation of the request back to the server and the logic needed to parse the server's response.

Although the systems and methods for client-side callbacks to server events have been described in language specific to structural features and/or methodological operations or actions, it is understood that the implementations defined in the appended claims are not necessarily limited to the specific features or actions described. Accordingly, the specific features and actions are disclosed as exemplary forms of implementing the claimed subject matter.

The invention claimed is:

1. A method comprising:
injecting a callback script, wherein the callback script is injected by a hierarchy of one or more server-side components for processing client-side events;
specifying, by one or more of the server-side components, a callback handler for handling a client-side event at a client, wherein the callback handler is specified prior to a client-side event;
receiving, by a Web server, a message indicating the client-side event which is associated with a specific component of a client resource, the specific component being one of multiple static components of the client resource, and wherein the received message identifies the one or more server-side components to process the client-side event;
identifying, on the server-side, the one or more server-side components that correspond to the specific component to process the client-side event;
communicating information from the received message to the one or more identified server-side components;
generating, by the one or more identified server-side components, a response to the message, wherein the response is not a full page postback, and wherein the one or more identified server-side components implement at least a subset of logic of the specific component, the server-side logic corresponding to other ones of the multiple static components not being used to generate the response; and
sending the response data to the callback handler.

2. A method as recited in claim 1, wherein the static components comprise a form.

3. A method as recited in claim 1, and wherein at least a subset of the static components are being presented to a user by a browser-based Web application executing on a client computing device.

4. A method as recited in claim 1, wherein server-side logic for the static components is identified with a Universal Resource Identifier (URI).

5. A method as recited in claim 1, wherein the response does not comprise rendered markup language.

6. A method as recited in claim 1, wherein the response is an incremental update of the client resource, the incremental update not being directed to update respective ones of the static components different from the specific component.

7. A method as recited in claim 1, further comprising:
the one or more server-side components identifying a client-side event handler to receive the response in view of an error.

8. A method as recited in claim 1, wherein the client resource is a page, and wherein generating the response further comprises not performing a full page lifecycle for the page.

9. A method as recited in claim 8, wherein not performing a full page lifecycle for the page comprises not pre-rendering or rendering information associated with any one of the static components different from the specific component.

10. A method as recited in claim 8, wherein not performing a full page lifecycle for the page comprises not pre-rendering or rendering information associated with the specific component.

11. A method comprising:
receiving a callback script, wherein the callback script is received by a client device from a hierarchy of one or more server-side components for processing client-side events;
receiving an indication of a callback handler for handling a client-side event, wherein the indication of the callback is received by a client device from one or more server-side components prior to a client-side event;
identifying the client-side event which is associated with at least one specific component of a resource being hosted by the client device, the resource comprising a plurality of static components that include the at least one specific component;
identifying the one or more server-side components that logically correspond to the at least one specific component to process the client-side event;
communicating, by the client device, a message to the identified one or more server-side components, the message identifying the client-side event associated with the at least one specific component and the identified one or more server-side components; and
receiving by the callback handler, a response to the message from a Web server, the response being generated by the identified one or more server-side components that logically correspond to the at least one specific component, the response not comprising data generated by any server-side component associated with respective ones of the static components different than the specific component, and wherein the response is not a full page postback.

12. A method as recited in claim 11, wherein the static components comprise a Web page.

13. A method as recited in claim 11, wherein the response does not comprise a rendering of a markup language.

14. A method as recited in claim 11, and further comprising presenting, by a browser-based Web application executing at the client device, at least a subset of the static components.

15. A method as recited in claim 11, and further comprising, responsive to receiving the response, incrementally updating only portion(s) of the resource corresponding to the at least one specific component.

16. A method as recited in claim 11, further comprising:
responsive to receiving the response, rendering data in the response into a markup language for presentation on a display device, the data only corresponding to the at least one specific component.

17. A method as recited in claim 11, and further comprising:
providing interactivity, by a Web application executing on the client device and hosting the resource, to a user during a time period from the communicating to the receiving, the interactivity being provided with respect to at least a subset of the static components that are different than the at least one specific component.

18. A computer-readable storage medium comprising computer-executable instructions stored in a memory for execution by a processor for client-side callbacks to server events, the computer-executable instructions comprising instructions for:
injecting a callback script, wherein the callback script is injected by a hierarchy of one or more server-side controls for processing client-side events;
specifying, by one or more of the server-side components, a callback handler for handling a client-side event, wherein the callback handler is specified prior to the client-side event;
receiving, by the one or more server-side controls, a message indicating the client-side event associated with a specific component of a client resource, the specific component being one of a plurality of static components of the client resource, the message being targeted only to a subset of the server-side controls, and wherein the received message identifies the subset of the server-side controls to process the client-side event;
identifying, on the server-side, the subset of the server-side controls that corresponds to the specific component to process the client-side event;
communicating information from the received message to the identified subset of the server-side controls;
generating, by the subset of the server-side controls, a response to the message, wherein the response is not a postback of the client resource;
sending the response data to the callback handler; and
rendering data in the response into a markup language for presentation on a display device.

19. A computer-readable storage medium as recited in claim 18, wherein the response is not a full submittal of the client resource.

20. A computer-readable storage medium as recited in claim 18, wherein the response does not comprise markup language.

21. A computer-readable storage medium as recited in claim 18, wherein the static components comprise a form.

22. A computer-readable storage medium as recited in claim 18, wherein the response is an incremental update of the client resource, the incremental update not being directed to update respective ones of the static components different from the specific component.

23. A computer-readable storage medium as recited in claim 18, wherein the instructions for generating the response further comprise instructions for not pre-rendering information associated with any one of the static components different from the specific component.

24. A computer-readable storage medium as recited in claim 18, further comprising instructions for communicating, by the server-side control, the response to the client-side callback handler, the client-side callback handler being configured to process data in the response as a function of the architecture of a server-side control that logically corresponds to the specific component.

25. A computer-readable storage medium comprising computer-executable instructions stored in a memory for execution by a processor for client-side callbacks to server events, the computer-executable instructions comprising instructions for:

receiving a callback script, wherein the callback script is received by a client computing device from a hierarchy of one or more server-side controls for processing client-side events;

receiving an indication of a callback handler for handling a client-side event, wherein the indication is received by a client device from one or more server-side components prior to the client-side event;

identifying the client-side event which is associated with at least one specific component of a resource being hosted by the client computing device, the resource comprising a plurality of static components that include the at least one specific component;

identifying the one or more server-side controls for processing the client-side event;

communicating, by the client device, a message to the identified server-side controls, the message identifying the client-side event associated with one or more particular components of the static components and the identified server-side controls;

receiving, by the by the callback handler, a response to the message, wherein the response is not a full page postback and wherein the response is generated by the one or more identified server-side controls; and rendering data in the response into a markup language for presentation on a display device.

26. A computer-readable storage medium as recited in claim 25, wherein the message is not a full page post.

27. A computer-readable storage medium as recited in claim 25, wherein the static components comprise a form.

28. A computer-readable storage medium as recited in claim 25, further comprising, responsive to receiving the response, instructions for incrementally updating by a browser-based Web application using the static components, one or more of the resource corresponding to the one or more particular components.

29. A computer-readable storage medium as recited in claim 25, further comprising instructions for providing interactivity, by a Web application executing on the client device and hosting the resource, to a user during a time period from the communicating to the receiving, the interactivity being provided with respect to at least a subset of the static components that are different than the one or more particular components.

30. A server computing device for handling client-side callbacks to server events, the computing device comprising:
a processor; and
a memory coupled to the processor, the memory comprising computer-program instructions executable by the processor for:
injecting a callback script, wherein the callback script is injected by a hierarchy of one or more server-side components for processing client-side events;
specifying, by one or more of the server-side components, a callback handler, wherein the callback handler is specified prior to a client-side event;
receiving a message indicating a client-side event associated with a specific component of a client resource, the specific component being one of a plurality of static components of the client resource, and wherein the received message identifies the one or more server-side components to process the client-side event;
identifying, on the server-side, the one or more server-side components, that correspond to the specific component, to process the message;
communicating information from the received message to the one or more identified server-side components; and
generating, by the one or more server-side components, a response to the message, wherein the response is not a full page postback, and wherein server-side logic corresponding to other ones of the static components is not used to generate the response.

31. A computing device as recited in claim 30, wherein the message is not a full page post.

32. A computing device as recited in claim 30, wherein the static components comprise a form.

33. A computing device as recited in claim 30, wherein the response represents an incremental update of the resource, the incremental update not being directed to update of respective ones of the static components different from the specific component.

34. A computing device as recited in claim 30, wherein the computer-program instructions generating the response further comprise computer-program instructions for not pre-rendering or rendering information associated with any one of the static components different from the specific component.

35. A client device computing device comprising:
a processor; and
a memory coupled to the processor, the memory comprising computer-program instructions executable by the processor for:
receiving a callback script, wherein the callback script is received by a client device from a hierarchy of one or more server-side controls for processing client-side events;
receiving an indication of a callback handler for handling a client-side event, wherein the indication is received by the client device from one or more server-side components prior to the client-side event;
identifying the client-side event associated which is with at least one specific component of a resource being hosted by the client device, the resource comprising a plurality of static components that include the at least one specific component;
identifying the one or more server-side controls that logically correspond to the at least one specific component to process the client-side event;
communicating a message to the identified one or more server-side controls, the message identifying a client-side event associated with at the least one specific component and the identified one or more server-side controls; and
receiving a response to the message, wherein the response is not a full page postback and is not comprised of data generated by any server-side control associated with respective ones of the static components different than the specific component; and
sending the response data to the callback handler.

36. A computing device as recited in claim 35, wherein the response represents only data for an incremental update of portion(s) of the resource corresponding to the at least one specific component.

37. A computing device as recited in claim 35, and further comprising computer-program instructions for providing interactivity, by a Web application executing on the client device and hosting the resource, to a user during a time period from the communicating to the receiving, the interactivity being provided with respect to at least a subset of the static components that are different than the at least one specific component.

* * * * *